United States Patent [19]
Vargo et al.

[11] Patent Number: 5,934,464
[45] Date of Patent: Aug. 10, 1999

[54] CONTAINER

[75] Inventors: Peter V. Vargo, 611 Ash St., Watsontown, Pa. 17777; John V. Vargo, Jr., Turbotville, Pa.

[73] Assignee: Peter V. Vargo, Watsontown, Pa.

[21] Appl. No.: 09/174,291

[22] Filed: Oct. 16, 1998

[51] Int. Cl.⁶ .................................................. A01K 97/00
[52] U.S. Cl. ...................... 206/315.11; 206/815; 43/57.1
[58] Field of Search ........................... 206/315.1, 315.11, 206/815; 43/54.1, 57.1

[56] References Cited

U.S. PATENT DOCUMENTS

| | | | |
|---|---|---|---|
| 4,862,635 | 9/1989 | Conte | 206/315.11 |
| 5,640,795 | 6/1997 | Wambolt | 206/315.11 |

*Primary Examiner*—Jacob K. Ackun
*Attorney, Agent, or Firm*—Thomas R. Shaffer, Esq.

[57] ABSTRACT

A container is disclosed for fishing lures or other objects. The container includes an outer tube having a cylindrical side wall and one closed end and one open end. The cylindrical side wall has an elongated opening therein and the outer tube has recess therein. The container also includes an inner tube which is rotatably mounted within the outer tube. The inner tube has a cylindrical side wall and also has one closed end and one open end. The open end of the inner tube is sized for longitudinal insertion into the open end of said outer tube. The side wall of the inner tube also has an elongated opening therein and inner tube has a rib thereon which cooperates with the recess to longitudinally hold the inner tube within the outer tube. Rotation of the inner tube to a rotational position where the elongated opening of the inner tube is in alignment with the elongated opening of the outer tube provides a substantial area of access to the interior of the container. Rotation of the inner tube to any other rotational position provides a closed container. Various other details and features are disclosed.

14 Claims, 6 Drawing Sheets

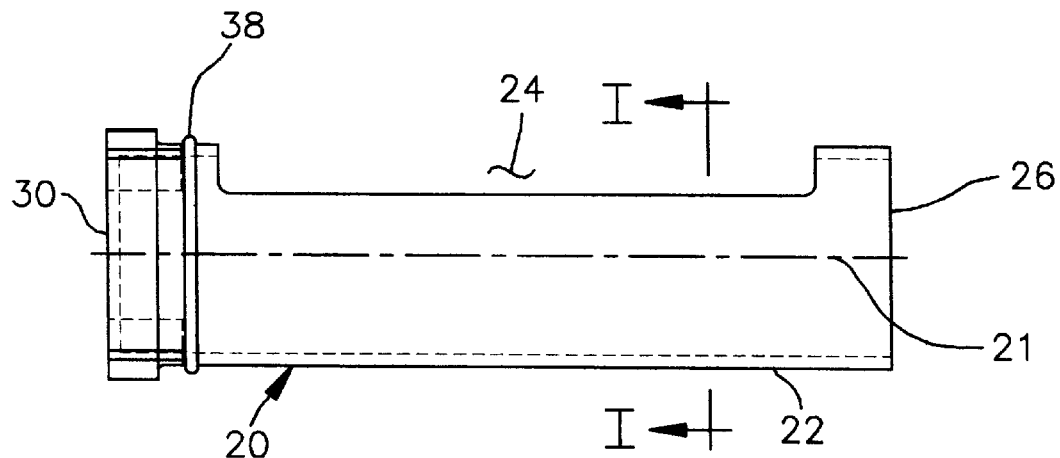
FIG. 3a
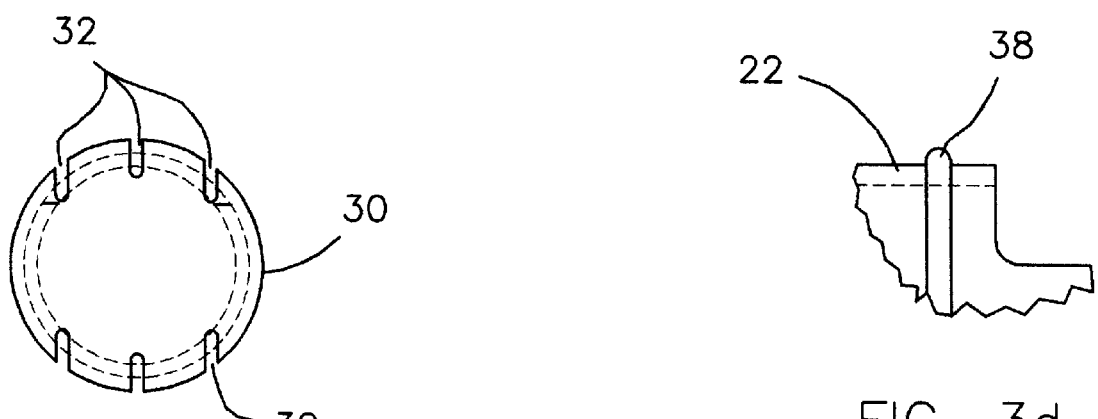
FIG. 3b
FIG. 3d
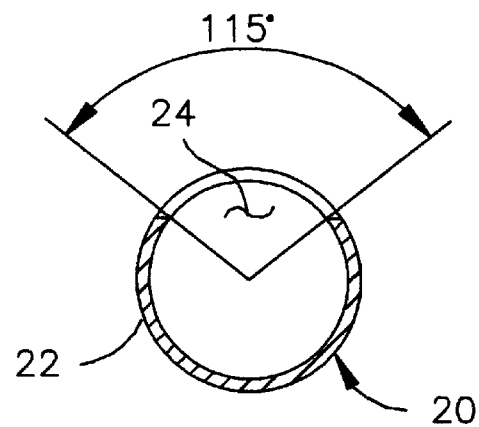
SECTION I-I
FIG. 3c

SECTION I-I

CONTAINER

BACKGROUND OF THE INVENTION

1. Field of the Invention

The present invention relates to containers. More specifically, it relates to easy open containers, particularly useful for holding fishing lures and the like.

2. Description of the Prior Art

A variety of containers have been proposed for fishing lures. For example, Beneke, U.S. Pat. No. 4,681,220 discloses a fishing lure container 10 which includes a transparent elongated cylinder 11 sized and proportioned to contain a fishing lure 12. The cylinder is preferably aperatured at 13 to provide for both ventilation and drainage. The container includes a first end piece 21 which is held by friction on the end of the cylinder. When it is removed from the end, access to the interior is provided. The first end piece 21 is provided with a tab (29, 30) which facilitates removal of the end piece 21. A second end piece 31 also having a tab 37, 38 is provided at the other end of the cylinder 11. This patent is representative of the problem with most cylindrical containers in that access is typically provided only at one or both ends thereof which provides a limited area of access. This can make access to the container difficult and even dangerous when the contents include objects with sharp hooks. If a fishing lure were to become stuck in such a container, removal of the same would be exceedingly difficult.

Another example of a similar fishing lure container is disclosed by Crosby in U.S. Pat. No. 5,533,297. In Crosby, a fishing lure container 10 includes a tubular transparent envelope 20 formed of a rigid impact resistant waterproof material. In FIG. 1, the envelope 20 has an open end defining a mouth 26 which has a raised lip 22 thereon. It is through this mouth 26 that a fishing lure 150 may be passed. The other end 24 of the envelope 20 is closed. The lip 22 has a longitudinal V-notch formed therein which allows the fishing lure leader to extend through the envelope 20. In FIGS. 3 and 4, a second embodiment of the invention is disclosed wherein the second end of the envelope is also open defining a second mouth 92. The patent discloses a provision of a tab 122 having a lateral hole 124 therethrough to allow the container 110 to be hung on a peg or the like for storage, transport or display. This patent suffers from the same shortcomings, namely that access is only provided through one or both ends of the longitudinal tube.

Allard, U.S. Pat. No. 4,437,258, discloses a complex fishing leader holder which is used to carry leaders without them becoming entangled or knotted. The holder consists of an outer tube 1 and an inner tube 2 which is rotatably mounted within the outer tube 1 and held in position within outer tube 1 by collars 3. A cap 4 is secured to one end of the inner tube 2 and a securement part 5 is provided which can slide within the inner tube 2. Both the outer tube and the inner tube have longitudinally extending slots through which a projection 9 of the securement part 5 may pass. An eyelet 11 extends from one end of the securement part 5. The cap 4 has a resilient part 12 which can be in the form of coil springs. When leaders are secured to the eyelet, they can be withdrawn into the inner tube 2 by moving the securement part 5 by the enlarged head 10. When the projection 9 reaches the other end of the aligned slots 6 and 8, the projection 9 can be moved along short slot 7 after securement part 5 has been moved against the resiliency of the resilient part 12, so rotating inner tube 2 with respect to outer tube 1 and covering the slot 8 with part of the surface of outer tube 1. The holder is effectively held in this closed position by the resilient part 12. In order to obtain a leader from the holder or insert another leader into the holder, it is then necessary to move projection 9 along slot 7 by means of the enlarged head 10, so rotating the inner tube with respect to the outer tube 1, and aligning slots 6 and 8. The securement part can then be slid along the inner tube 2 by the enlarged head 10 so exposing the eyelet 11, so that a leader can be removed or added. While this patent teaches the use of an inner tube rotatable within an outer tube each of which having a longitudinal slot therein, the slots are not utilized to provide access to the interior of the container but rather to provide a path of travel for projection part 9 of the securement part 5.

Thus, there remains a need for a container which may be used for fishing lures or for the storage of any other small parts or objects, which has a tubular shape but which allows for a substantial area of access to the interior of the container through the cylindrical side wall of the container.

SUMMARY OF THE INVENTION

The present invention solves the above identified problems by providing a container which has an outer tube having a cylindrical side wall and having one closed end and one open end thereon, said cylindrical side wall having an elongated opening therein and said outer tube having a first locking means portion thereon. An inner tube is also provided which is rotatably mounted within said outer tube. Said inner tube having a cylindrical side wall and having one closed end and one open end thereon, said open end of said inner tube sized for longitudinal insertion into said open end of said outer tube, said cylindrical side wall having an elongated opening therein, said inner tube having a second locking means portion which cooperates with said first locking means portion to longitudinally hold said inner tube within said outer tube and whereby rotation of said inner tube with respect to said outer tube to a rotational position where the elongated opening of said inner tube is in alignment with the elongated opening of said outer tube provides the substantial area of access to the interior of the container and rotation of said inner tube to any other rotational position provides a closed container.

In a preferred embodiment of the invention, the first locking means portion comprises one of a bead and a recessed formed on an inner surface of said outer tube and said second locking means portion comprises the other of a bead and a recess formed on an outer surface of the inner tube whereby said inner tube is longitudinally held within the outer tube by frictional engagement of said bead and said recess. It will be obvious that in the event that a bead is provided on the inner surface of the outer tube, that a recess would be formed on an outer surface of the inner tube. Conversely, if the recess is formed on an inner surface of the outer tube, then a bead would be formed on the outer surface of the inner tube. Preferably, the bead continues around the entire outside diameter of the tube but it will be obvious to those of ordinary skill in the art that it could be provided for only a small fraction of such distance. Preferably, the cylindrical wall of the outer tube has a flat surface formed thereon at a location on the cylindrical wall opposite said elongated opening therein. Such a flat surface serves at least the following two purposes. First, it provides a flat surface for the tube to rest upon without rolling off a table or other planer surface. Additionally, the flat surface provides a flat and suitable location for the attachment of a strip of Velcro, a strip of magnetic material or other attachment means. The attachment means provided thereon allows for attachment of the container to another object. In the preferred embodiment of the invention, the attachment means comprises a strip of Velcro fixed to the flat surface and wherein the object also has a corresponding strip of Velcro thereon.

In one embodiment of the invention, the invention further comprises an additional outer container in the form of a soft shelled case having an interior surface having vertically aligned spaced apart strips of Velcro attached thereto to allow for removable attachment of multiple containers to the interior surface of said case in a horizontal or vertical orientation. It will be obvious to those skilled in the art that the Velcro strips could be placed in any of a variety of orientations thus allowing for organization of the containers in any desired configuration. Alternatively, a complete sheet of Velcro fabric or a material equivalent to Velcro may be used instead of spaced apart strips.

In yet another embodiment of the invention, the object to which the containers may be attached comprises a vest having spaced apart Velcro strips (or a complete sheet of Velcro fabric or a material equivalent to Velcro) attached thereto to allow for removable attachment of multiple containers to the vest. In addition to or as an alternative to a vest, a fanny pack, belt, or back pack could likewise be utilized as the object to which the containers may be attached. Similarly, the object may consist of a display board having strips of a sheet of Velcro fabric or the like attached thereto.

As indicated above, the attachment means may also comprise a magnetic strip affixed to the flat surface. In this instance, the object to which the container would be attached would include a metallic surface. This would be particularly useful in shops, testing laboratories or work areas where containers for multiple small objects are frequently utilized. The invention is also useful as a display for objects for retail sale and for market promotions.

The elongated openings in both the inner tube and the outer tube are each preferably sized at least large enough for the insertion of an average sized human finger. Thus, the opening creates a large area of access to the container when the elongated openings are aligned. By providing a substantial area of access and preferably one which allows for the insertion of a thumb and finger, it is an extremely easy process of placing lures or other objects into the container or removing said objects from the container. This is far different from the previous practice of removing objects only from one or both ends of a cylindrical tube.

Preferably, the inner tube has a bead located near the closed end thereof and the outer tube has a corresponding recess located near the open end thereof. This location is preferred since the bead and recess form a seal near the location of the open end of the outer tube, thus creating a more fully enclosed container.

Preferably, the closed end of the inner tube and the closed end of the outer tube are each provided with a plurality of elongated holes therein. The elongated holes in said closed ends allow for drainage of liquids from the container and the drying of objects stored within the container.

Preferably, the elongated holes provide an enhanced gripping surface to allow for easier rotation of the inner tube relative to the outer tube.

Alternatively, the outside surface of the closed ends of the inner and outer tubes may be formed to include a plurality of gripping protrusions around the circumference thereof to allow for easier rotation of the inner tube relative to the outer tube.

It is an object of the present invention to provide a clear plastic container which provides a large opening in the cylindrical side wall thereof to allow for easy access to the interior of said container.

It is an additional object of the present invention to provide a container which has only two component parts, namely an inner tube and an outer tube.

It is still another object of the present invention to provide a locking means which will allow the inner tube to be restrained within the outer tube against longitudinal movement. It is yet another object of the invention to provide a container which allows for rotation of the inner tube relative to the outer tube.

It is an object of the present invention to provide an easy and effective means to attach the container of the present invention to a soft shelled case, vest or other objects.

It is an object of the present invention to create a cylindrical container which is cost effective to manufacturer and which has utility in a variety of different fields of endeavor where containers for such objects are utilized.

These and other objects of the present invention will be more fully explained upon reference to the drawings and the detailed description of the preferred embodiments of the present invention which follow.

BRIEF DESCRIPTION OF THE DRAWINGS

FIG. 3a is side elevational view of the inner tube of the container of the present invention.

FIG. 3b is an end view of the inner tube of FIG. 3a.

FIG. 3c is a cross-sectional view taken on the line I—I of FIG. 3a.

FIG. 3d is an enlarged view of the rib of FIG. 3a.

FIG. 4b is an end view of the outer tube of FIG. 4a.

FIG. 4c is a cross-sectional view taken on the line I—I of FIG. 4a.

FIG. 4d is an enlarged view of the recess portion of FIG. 4a.

DETAILED DESCRIPTION OF THE PREFERRED EMBODIMENTS

Figure 1:
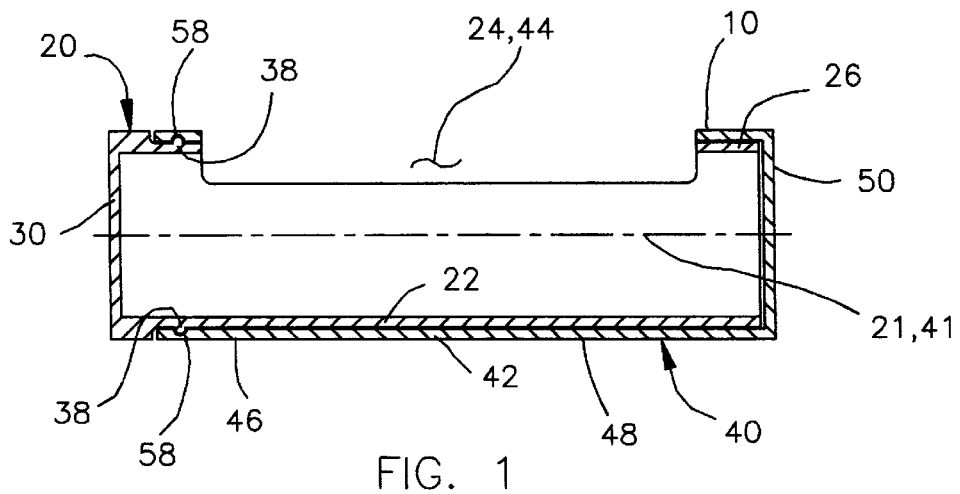
FIG. 1 is cross-sectional view of the container of the present invention in assembled form.

Referring to FIGS. 1 through 4c, the present invention provides a container 10 which includes an inner tube 20 and an outer tube 40. Each tube number is integrally formed of a clear resilient plastic material or other resilient material. The tube members are preferably formed by a plastic molding operation which will be well known to those of ordinary skill in the art.

The details regarding inner tube 20 are specifically shown in FIGS. 3a, 3b, 3c and 3d. The inner tube 20 includes a cylindrical side wall 20 formed around a longitudinal center line 21. The tube 20 includes an open end 26 and a closed end 30. A large elongated opening 24 is provided in the inner tube 20. A bead 38 is provided near the closed end 30. Preferably, the bead has a width and height of approximately 0.031 inches and is formed with a radius of 0.015 inches.

Referring to FIG. 3b, the closed end of the inner tube 20 is provided with a plurality of elongated slots 32 which allow for drainage and drying of the contents of the container. As shown in FIG. 3c, the opening 24 preferably radially extends around approximately 115 degrees of the circumference of the cylindrical wall member 22. An opening this large is preferred since it provides a large area allowing for easy access and is small enough to still allow the cylindrical wall 22 to retain strength and structural integrity. If a larger angle is utilized, there is a risk that the cylindrical wall 22 will no longer have the same degree of strength. Similarly, while a smaller radial opening will function, it will provide a smaller area of access making it more difficult to reach into the interior of the container with one's fingers.

The opening 24 as shown in FIG. 3a, also preferably extends a longitudinal distance of at least approximately ¾ the length of the tube 20. It is envisioned that a variety of containers having various dimensions would be made to receive various sized lures and other objects.

Referring to FIGS. 4a, 4b, 4c and 4d, the outer tube is shown. The outer tube 40 includes a cylindrical side wall 42 formed around a longitudinal center line 41. It will be obvious to those skilled in the art that when the inner tube is inserted within the outer tube, the center line axis 21 of the inner tube will be co-linear with the center line 41 of the outer tube. A large elongated hole 44 is provided in the cylindrical side wall 42. The elongated opening 44 has a size and configuration which matches exactly to the opening 24 in the inner tube 20. Opening 44 also preferably extends at least ¾ of the length of the outer tube and also preferably extends a radial distance of 115 degrees. The outer tube 40 has an open end 46 and a closed end 50. A recess 58 is formed on the interior surface of the open end 46. The recess 58 is designed to receive and mate with the bead 38 of the inner tube. It will be obvious to those of ordinary skill in the art that an alternative to that shown in the drawings is that the bead could be provided on the inner surface of the outer tube and a recess provided on the outer surface of the inner tube.

It will be obvious to those skilled in the art that a variety of other locking means could be utilized to hold the inner tube within the outer tube such as recessed segments on the inner surface of the outer tube and bead segments provided on the outer surface of the inner tube.

Figure 2A:
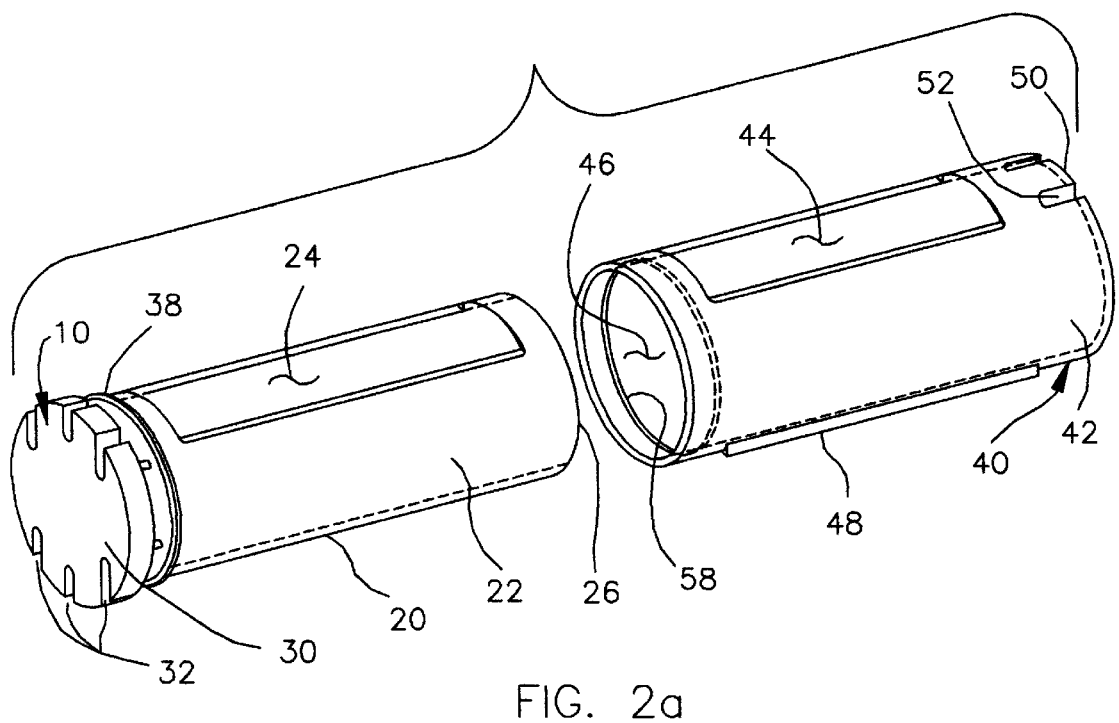
FIG. 2a is an isometric view of the container of the present invention in exploded form showing the outer and inner tubes.
Figure 4A:
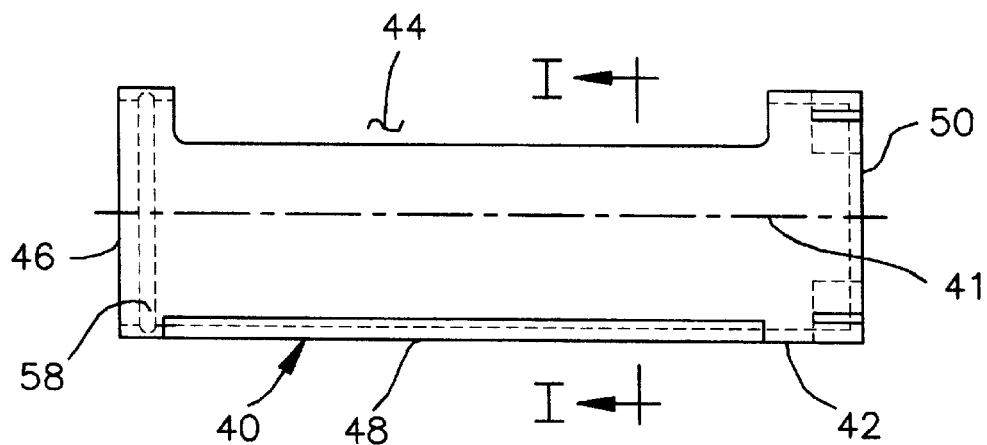
FIG. 4a is side elevational view of the outer tube of the container of the present invention.
Figure 4B:
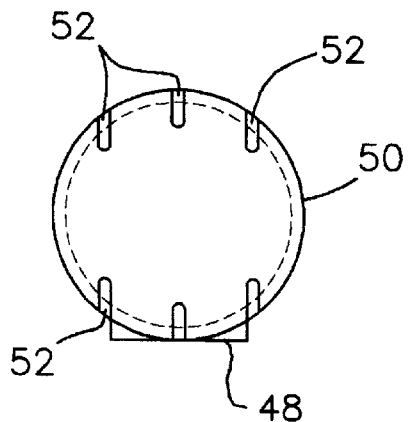
Figure 4D:
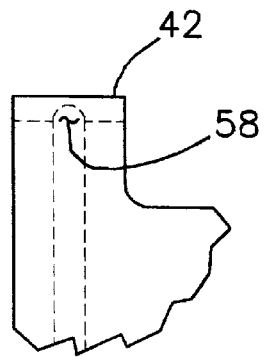
Figure 4C:
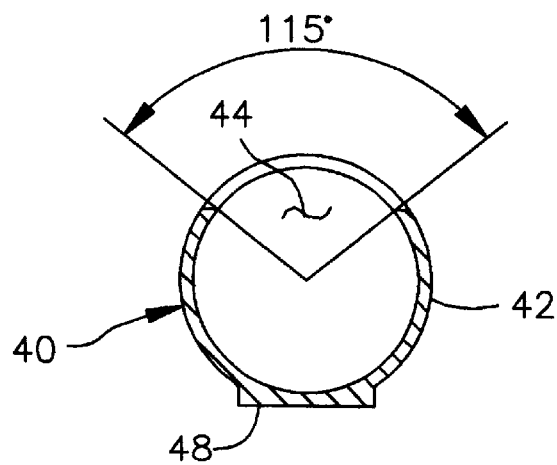

Outer tube 40, as best shown in FIGS. 4a, 4c and 2a, a flat surface 48 is preferably formed on the cylindrical side wall 42 of outer tube 40 at a radial location opposite opening 44. The flat surface 44 allows the tube to be placed on a table or flat surface without rolling and also provides a flat surface to facilitate the provision of a Velcro strip, magnetic strip or other attachment means to the outer tube 40.

Outer tube 40 includes an open end 46 and a closed end 50. The closed end 50 is provided with a plurality of elongated slots 52 to allow for drainage of the container and drying of the contents thereof.

FIG. 1 shows a cross-sectional view of the inner tube 20 as fully inserted within outer tube 40 and, as can be seen, the bead 38 engages within recess 58 to restrain longitudinal movement of the inner tube relative to the outer tube. FIG. 2a best shows the shape and configuration of the opening 24 in the inner tube 20 and the opening 44 in the outer tube 40.

Figure 2B:
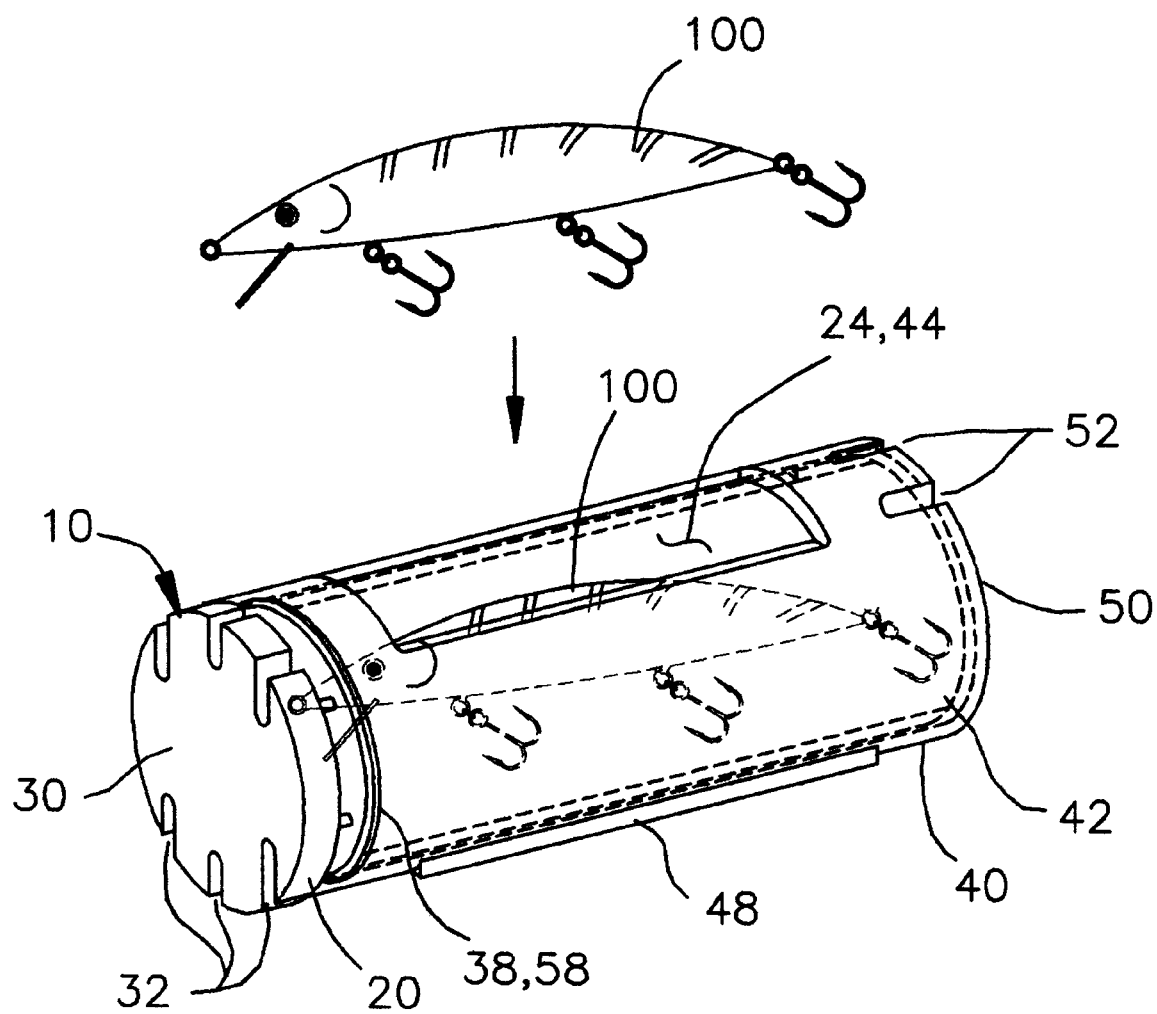
FIG. 2b is an isometric view of the container of the present invention as assembled and showing the insertion of a lure therein.

FIG. 2b is an isometric view of the container of the present invention as assembled which shows a fishing lure 100 as inserted through the opening 24, 44 of the container 10. Because of the substantial size of the opening 24, 44 it is relatively easy to simply reach into the opening with one's fingers and grab the body of the lure 100 without risk of harm from the hooks which extend downwardly therefrom.

In terms of manufacture, it is preferred that the slight taper be provided on the inner surface of the outer tube and on the outer surface of the inner tube to allow the core in the molding machine to be pulled out of the tube member as easily as possible.

Figure 5:
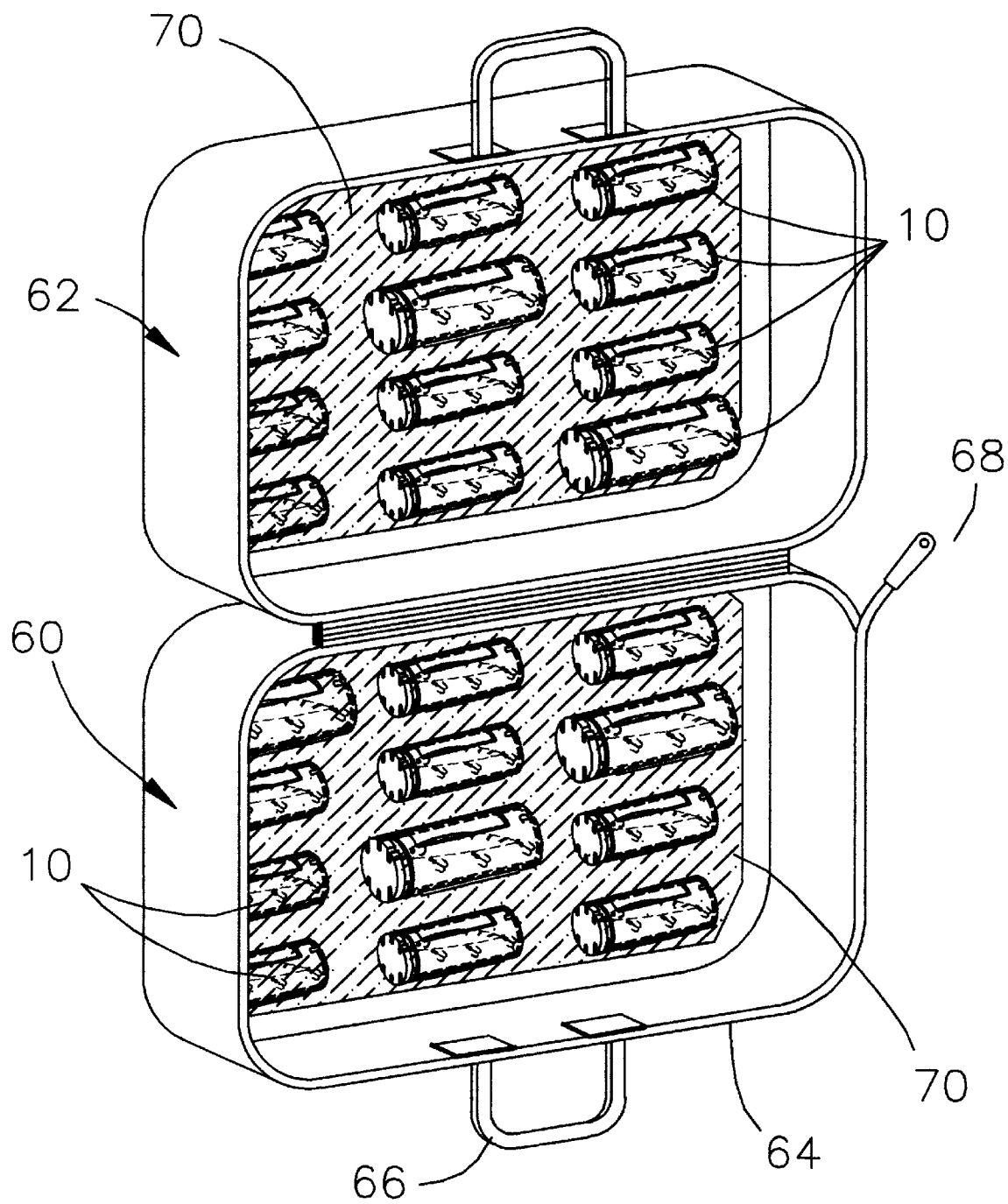
FIG. 5 is an isometric view of a soft carrying case in an open position showing the attachment of containers according to the present invention.

Referring to FIG. 5, a soft shelled carrying case 60 is shown. The case includes a lid 62 and a body portion 64. A handle 66 is preferably provided on the body portion and the lid opens and closes relative to the body and may be held in a closed position by zipper 68. The lid 62 preferably includes a sheet of Velcro fabric 70 lining the lid portion. As used in this patent application, the term Velcro is intended to include products sold under the trade name Velcro and any other similar hook compatible fabric sheets. This allows for the easy removable attachment of containers 10 in any desired orientation. The containers 10 have corresponding Velcro strips on the flat surface of the outer tube. Similarly, a sheet of Velcro fabric 70 is likewise attached (sewn or adhered) to the main body 64 of the case allowing for the removable attachment of additional tubes 10.

Figure 6:
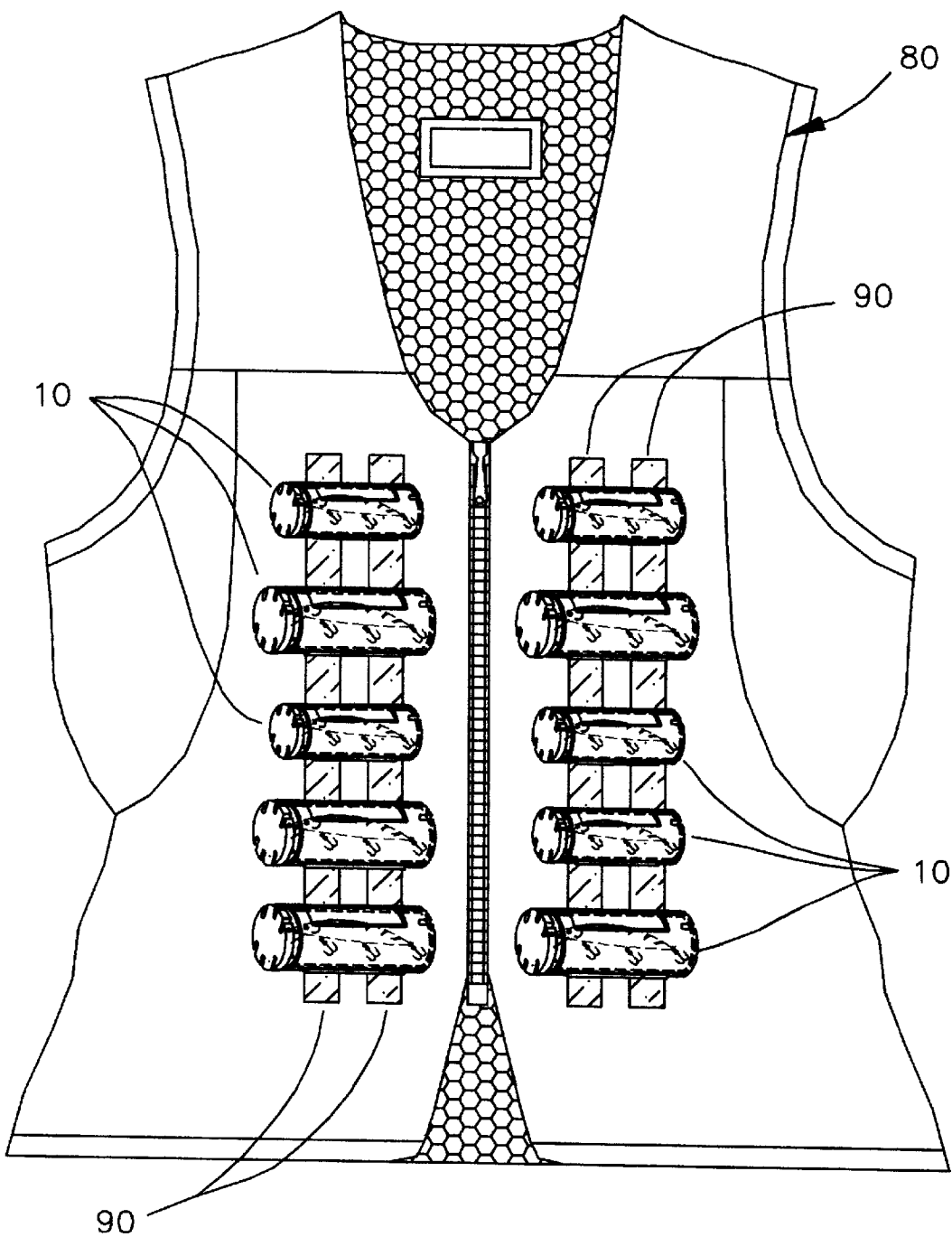
FIG. 6 is an isometric view of a fishing vest showing the attachment of containers according to the present invention.

In FIG. 6, a vest 80 is shown which includes a plurality of Velcro strips 90 attached thereto. This allows for the easy removable attachment of a plurality of tubes 10 to the vest. It will be obvious that one could simply remove a tube from the vest and place it into the container 60 and likewise remove a container 10 from case 60 and simply stick it onto the Velcro strips 90 of the vest 80 with little effort.

It will be appreciated by those skilled in the art that Velcro strips or a sheet of Velcro fabric could be provided on virtually any other object. For example, such strips could be placed on a desk, table, side wall, interior wall of a boat or on virtually any surface. This would allow for the removable attachment of containers 10 in a convenient and visible location for virtually any task. A carpenter could keep containers with screws attached to his work belt. A doctor or nurse could attach containers of drugs or supplies to a lab coat or other object. During surgery, necessary supplies could be affixed within easy reach of the doctor or nurse.

The attachment means while preferably in the form of mating Velcro strips could also be in the form of a magnetic strip. This would allow for easy attachment of the container to any metallic object. Such an attachment means could be extremely useful in garages, work shops or other locations where storage of nuts, bolts, screws or other objects is required.

As can be seen from the foregoing, the preferred use for the present invention is the storage of fishing lures. The present invention provides distinct advantages over the prior art with respect to fishing lures primarily in the provision of a large area of access into the container. This allows one to place lures into the container and remove lures therefrom with greatly reduced risk of injury from the hooks. With prior art methods, it was often necessary to simply allow gravity to allow a lure to slide onto one's hand. Such a method can result in a hook causing injury to the fisherman.

While certain presently preferred embodiments of the present invention have been described and illustrated, it is to be distinctly understood that the invention is not limited thereto but may be otherwise embodied and practiced within the scope of the following claims.

I claim:

1. A container comprising:
   (a) an outer tube having a cylindrical side wall and having one closed end and one open end thereon, said cylindrical side wall having an elongated opening therein, said outer tube having a first locking means portion thereon; and
   (b) an inner tube, rotatably mounted within said outer tube, said inner tube having a cylindrical side wall and having one closed end and one open end thereon, said open end of said inner tube sized for longitudinal insertion into said open end of said outer tube, said cylindrical side of said wall having an elongated opening therein, said inner tube having a second locking means portion which cooperates with said first locking means portion to longitudinally hold said inner tube within said outer tube, and whereby rotation of said inner tube with respect to said outer tube to a rotational position where the elongated opening of said inner tube is in alignment with the elongated opening of said outer tube provides a substantial area of access to the interior of the container and rotation of said inner tube to any other rotational position provides a closed container.

2. A container according to claim 1 wherein said first locking means portion comprises one of a bead and a recess formed on an inner surface of said outer tube and said second locking means position comprises the other of a bead and a recess formed on an outer surface of the inner tube whereby said inner tube is longitudinally held within the outer tube by frictional engagement of said bead in said recess.

3. A container according to claim 1 wherein said cylindrical wall of said outer tube has a flat surface formed thereon at a location on the cylindrical wall opposite said elongated opening therein.

4. A container according to claim 1 wherein said flat surface has attachment means provided thereon to allow for attachment of the container to another object.

5. A container according to claim 4 wherein said attachment means comprised a strip of Velcro affixed to said flat surface and said object has a Velcro surface.

6. A container according to claim 5 wherein said object further comprises an additional outer container in the form of a soft shelled case having an interior surface having spaced apart strips of Velcro attached thereto to allow for removable attachment of multiple containers to said interior surface of said case.

7. A container according to claim 5 wherein said object further comprises a vest having spaced apart strips of Velcro attached thereto to allow for removable attachment of multiple containers to said vest.

8. A container according to claim 4 wherein said attachment means comprises a magnetic strip affixed to said flat surface and said object has a metallic surface.

9. A container according to claim 1 wherein said elongated opening in said inner tube and said elongated opening in said outer tube are each sized at least large enough for the insertion of an average sized human finger and said openings create a large area of access to the container when aligned.

10. A container according to claim 1 wherein said inner tube has a bead located near the closed end thereof and said outer tube has a corresponding recess located near the open end thereof.

11. A container according to claim 1 wherein said closed end of said inner tube and said closed end of said outer tube each have elongated holes provided therein.

12. A container according to claim 11 wherein said elongated holes allow for drainage of liquids from and drying of objects stored within said container.

13. A container according to claim 11 wherein said holes provide an enhanced gripping surface to allow for easier rotation of the inner tube relative to the outer tube.

14. A container according to claim 1 wherein an outside surface of the closed ends of the inner and outer tubes is formed to include a plurality of gripping protrusions around the circumference thereof to allow for easier rotation of the inner tube relative to the outer tube.

* * * * *